Feb. 24, 1970 G. S. BROWN 3,496,599
APPARATUS FOR MAKING PLASTIC ARTICLES
Filed March 3, 1966 12 Sheets-Sheet 3
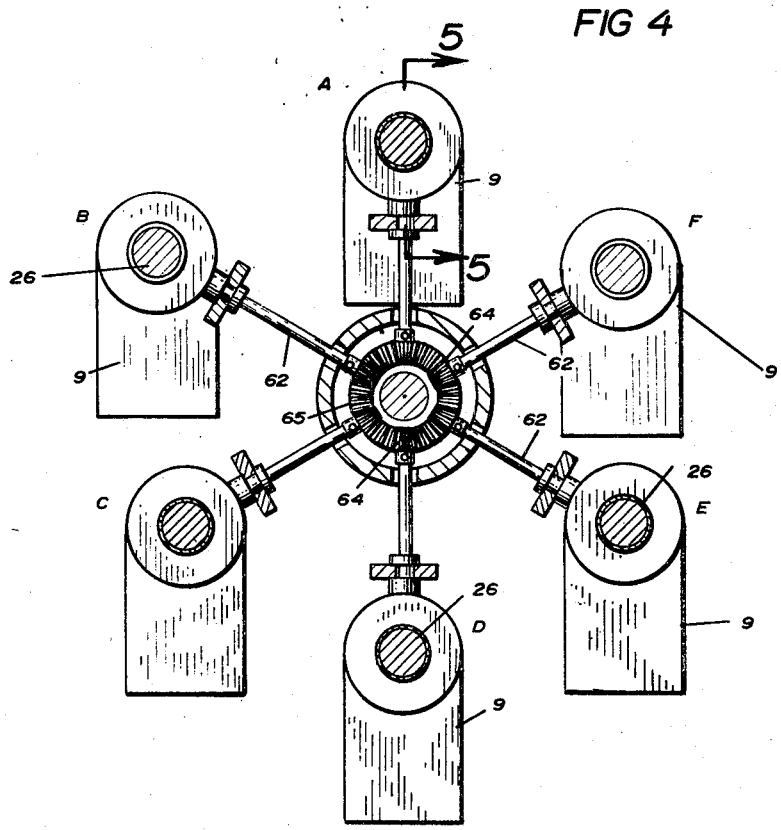
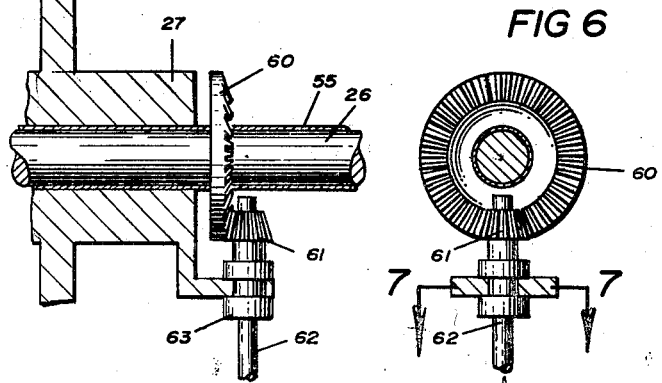
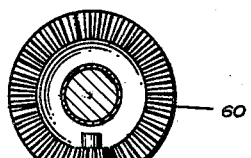
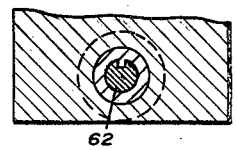
INVENTOR.
Grant S. Brown
BY
Wenderoth, Lind & Ponack
ATTORNEYS Feb. 24, 1970     G. S. BROWN     3,496,599
APPARATUS FOR MAKING PLASTIC ARTICLES
Filed March 3, 1966     12 Sheets-Sheet 6
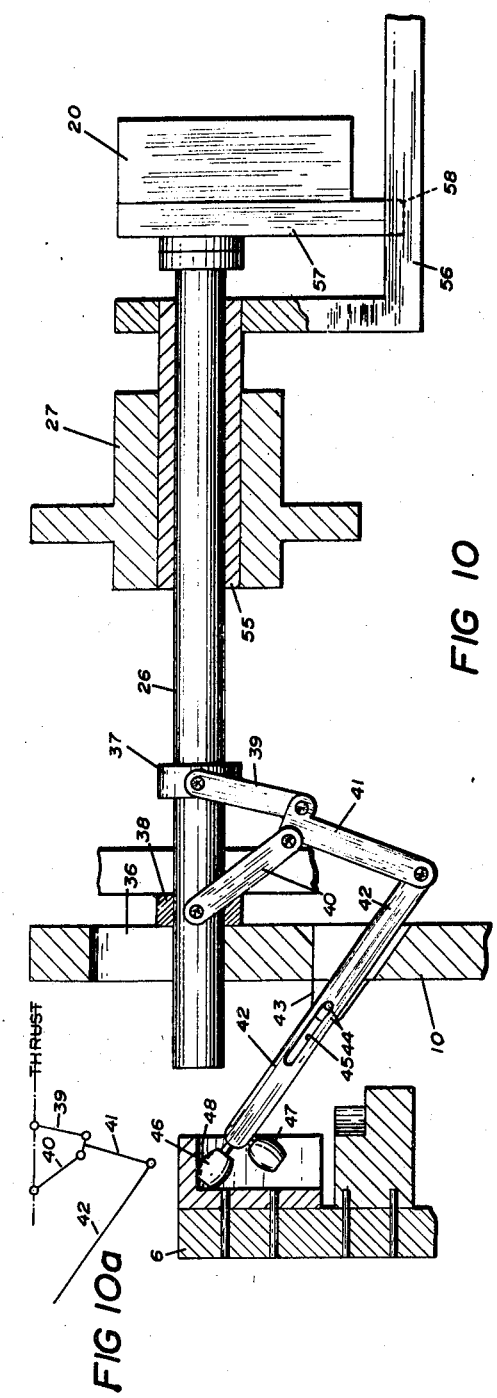
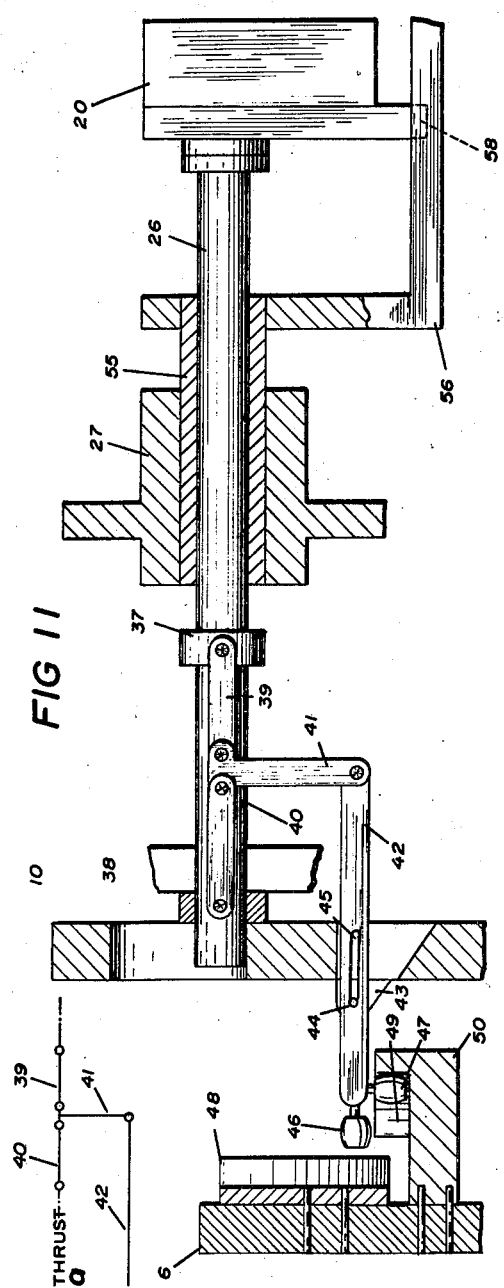
INVENTOR.
*Grant S. Brown*
BY
*Wenderoth, Lind & Ponack*
ATTORNEYS Feb. 24, 1970  G. S. BROWN  3,496,599
APPARATUS FOR MAKING PLASTIC ARTICLES
Filed March 3, 1966  12 Sheets-Sheet 7

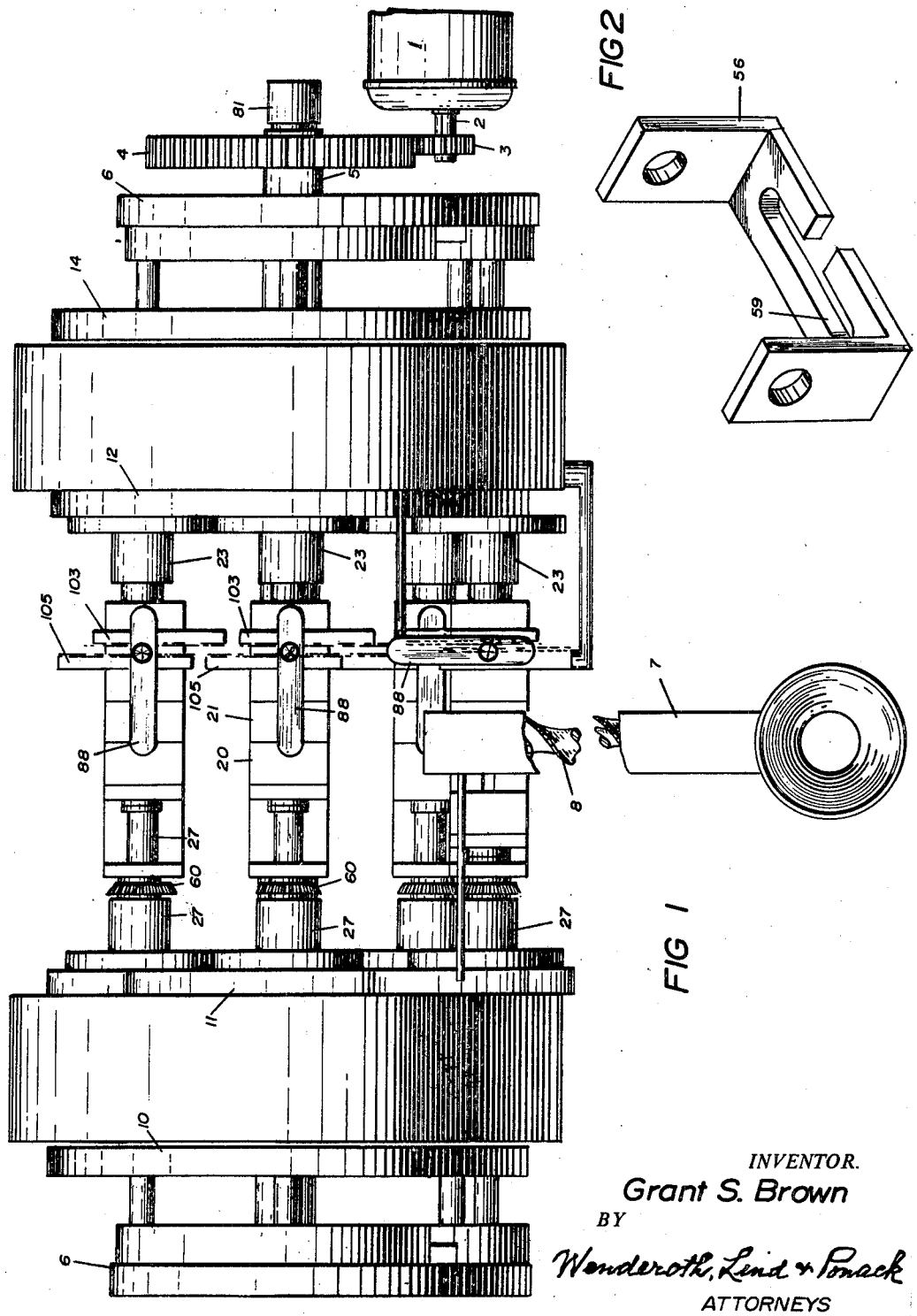

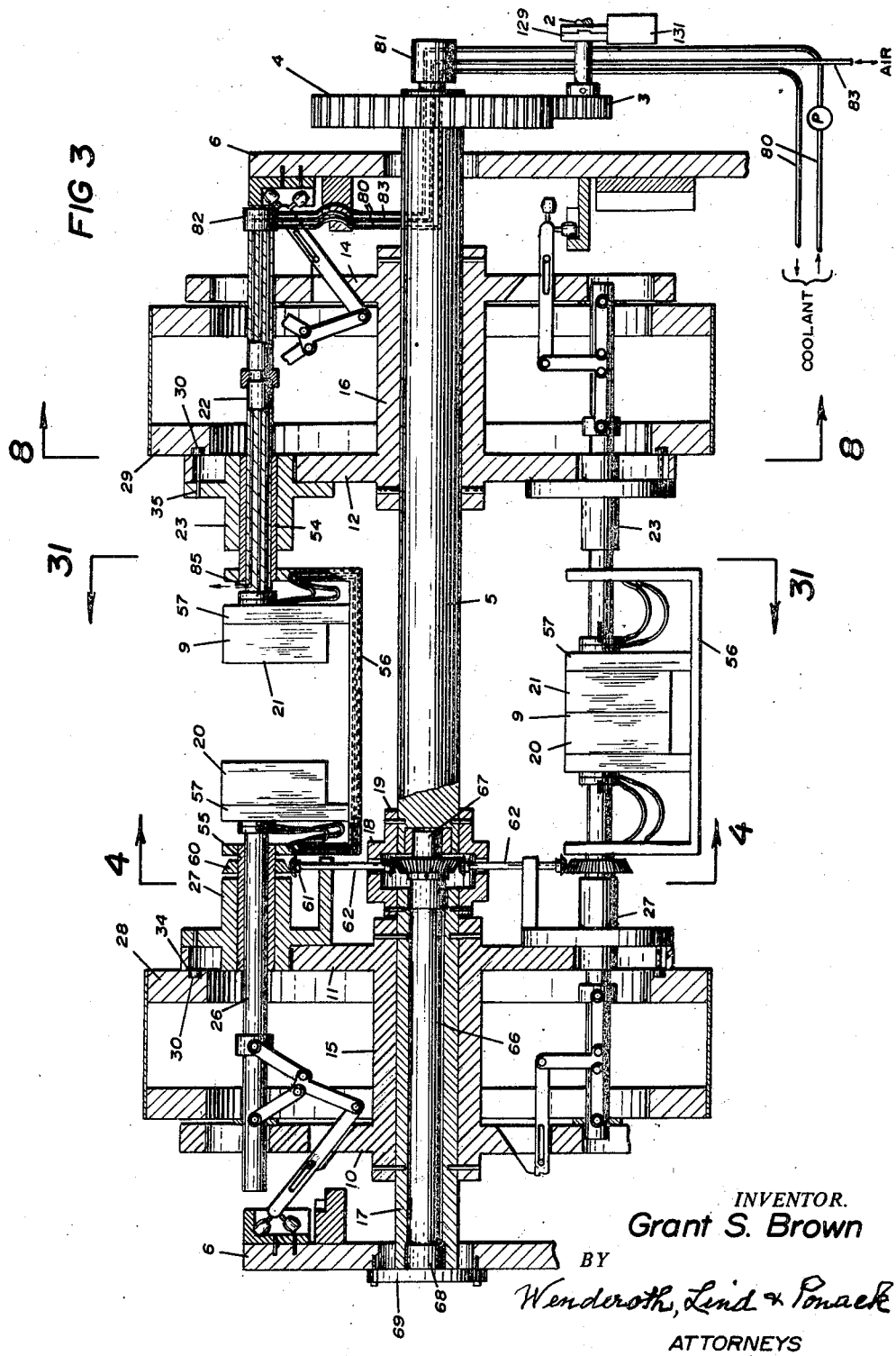

INVENTOR.
BY Grant S. Brown
Wenderoth, Lind & Ponack
ATTORNEYS

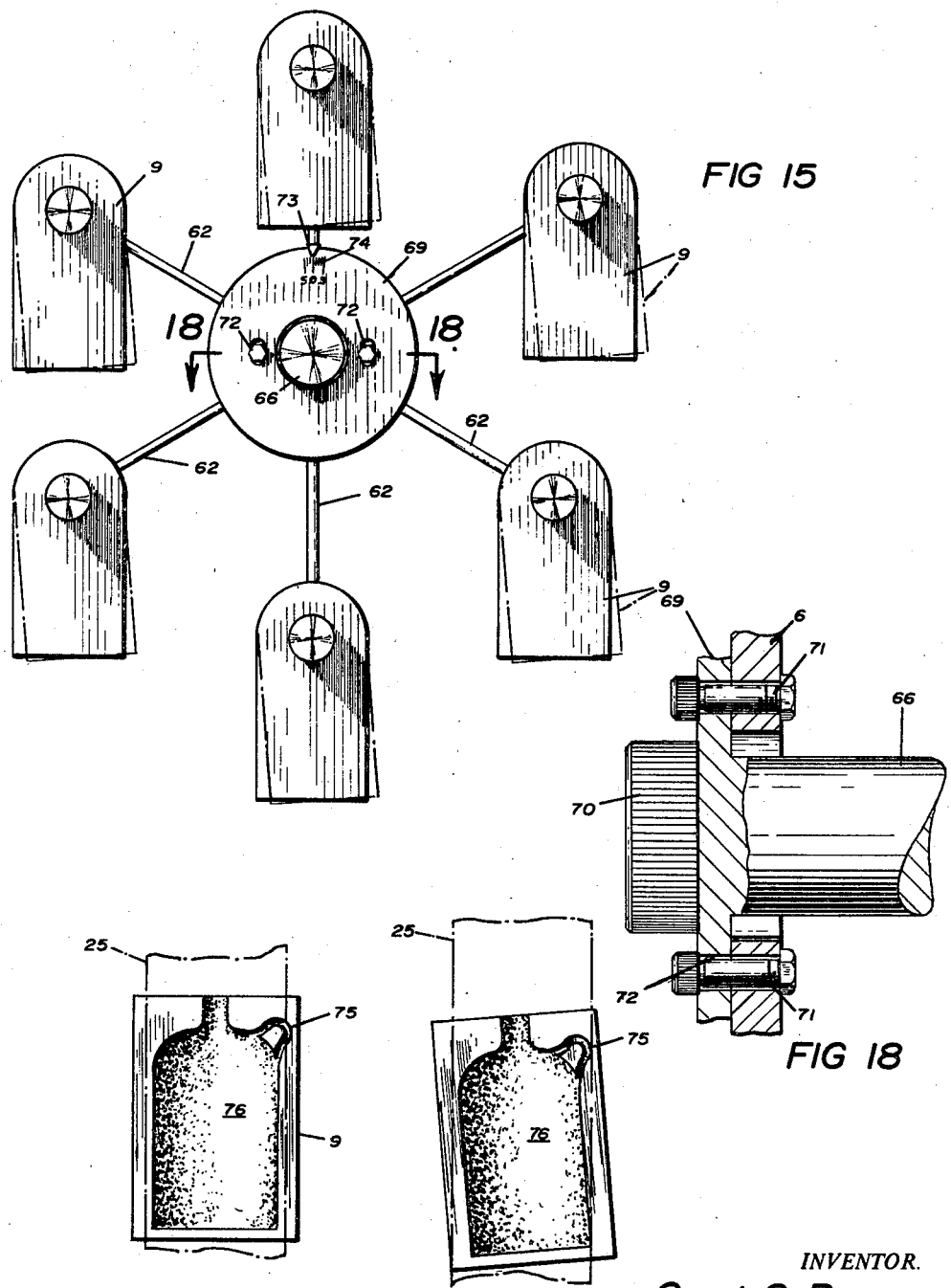

Feb. 24, 1970 G. S. BROWN 3,496,599
APPARATUS FOR MAKING PLASTIC ARTICLES
Filed March 3, 1966 12 Sheets-Sheet 9

INVENTOR.
Grant S. Brown
BY
Wenderoth, Lind & Ponack
ATTORNEYS

INVENTOR.
Grant S. Brown
BY
Wenderoth, Lind & Ponack
ATTORNEYS

Feb. 24, 1970 G. S. BROWN 3,496,599
APPARATUS FOR MAKING PLASTIC ARTICLES
Filed March 3, 1966 12 Sheets-Sheet 11
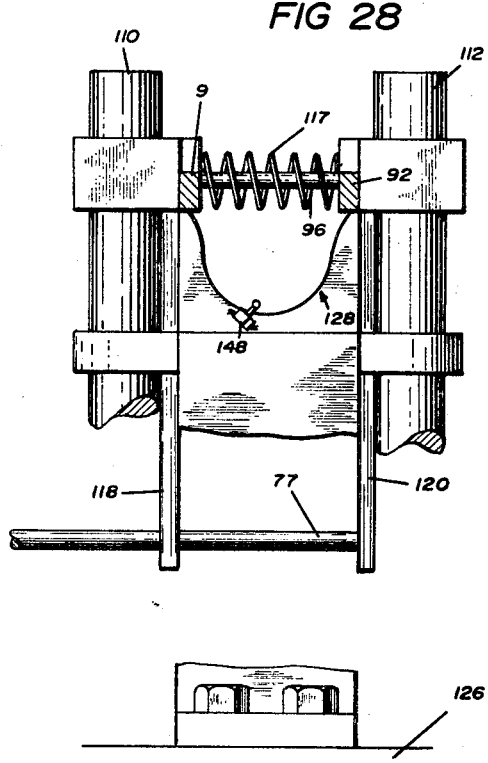
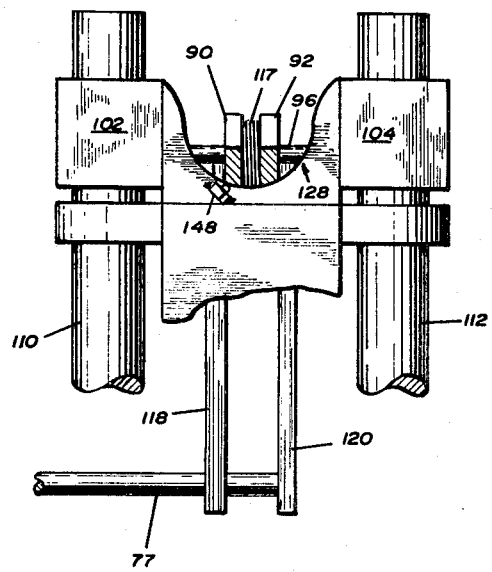
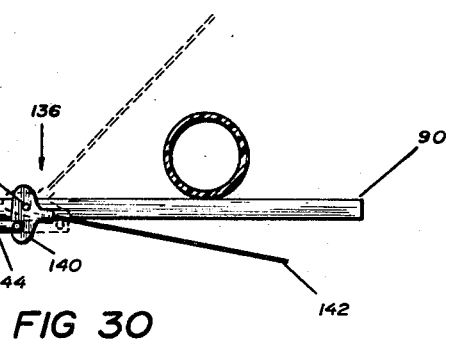
INVENTOR.
Grant S. Brown
BY
Wenderoth, Lind & Ponack
ATTORNEYS Feb. 24, 1970   G. S. BROWN   3,496,599
APPARATUS FOR MAKING PLASTIC ARTICLES
Filed March 3, 1966

INVENTOR.
Grant S. Brown
BY
Wenderoth, Lind & Ponack
ATTORNEYS

United States Patent Office 3,496,599
Patented Feb. 24, 1970

3,496,599
APPARATUS FOR MAKING PLASTIC ARTICLES
Grant S. Brown, Crest Lane, Scotch Plains, N.J. 07076
Filed Mar. 3, 1966, Ser. No. 531,451
Int. Cl. B29c 5/06
U.S. Cl. 18—5
28 Claims

ABSTRACT OF THE DISCLOSURE

A blow molding apparatus is provided with a series of molds mounted on a support for continuous rotation. The movement of the molds includes horizontal and vertical components effecting straight-line movement in substantial alignment with a continuously extruded column of tubular plastic material. The apparatus provides for the sequential opening of the molds and the closing thereof about the tubular material for sealing at least one end of the enclosed material and cutting the material adjacent the sealed end as soon as each mold is closed.

---

This invention relates to an apparatus for the production of expanded plastic articles formed from moldable extruded plastic material whereby a rapid continuous and automatic production of such articles may be made.

An object of the invention is to provide an apparatus for the continuous production of plastic molded articles by a series of forming molds arranged to travel in a vertical circular path having a horizontal portion and an adjacent vertical portion formed in the arc of such circular travel.

A further object of the invention is to provide means whereby thermoplastic material may be so directed into a mold as to permit the formation of irregular abutments upon the articles formed.

A further object is to permit the machine to move at a faster rate than the feed of parison which is accomplished by severing the parison above the mold.

A further object of the invention is to provide means whereby a controlled variable draw of the extruded plastic may be obtained so that the parison may be cut off under predetermined tension.

A further object of the invention is to maintain the center lines of the molds at all times in predetermined position with respect to a horizontal plane.

A further object of the invention is to provide means for sealing the thermoplastic extrusion against the passage of air during a continuous extrusion operation.

A further object of the invention is to provide means whereby the speed of travel of a mold is varied a predetermined amount at the time of opening and closing a mold.

A still further object is to provide means for blowing air into the parison within a mold by a mechanism having at first an angular movement to center such blowing mechanism over the mold and then a vertical downward movement for pressing the finish and admitting air into the mold.

A further object is to provide a construction whereby the cutting and tensioning of the parison takes place adjacent the top of the mold while the blowing of air into the parison is accomplished at the bottom end of the parison by a vertical upward and downward movement of the blowing mechanism.

With the above and other objects in view which will become apparent from the detailed description below, a preferred form of the invention is shown in the drawings in which:

FIGURE 1 is a diagrammatic plan view of the entire machine.

FIGURE 2 is a perspective view of a typical mold cradle.

FIGURE 3 is a sectional view with parts in elevation illustrating the cooling system, compressed air supply and two typical molds wherein one is closed and the other open.

FIGURE 4 is a sectional view taken upon section line 4—4 of FIGURE 3 with parts omitted for greater clarity.

FIGURE 5 is a cross-sectional view taken along section line 5—5 of FIGURE 4.

FIGURE 6 is a side view with parts omitted of the construction shown in FIGURE 5.

FIGURE 7 is a cross-sectional view along section line 7—7 of FIGURE 6.

FIGURE 10 is an enlarged elevational view with parts in section showing the toggle mechanism for opening and closing the molds.

FIGURE 10a is a diagrammatic view illustrating the leverage forces involved as shown in FIGURE 10.

FIGURE 11 is a similar view as FIGURE 10 of the toggle mechanism in closed position.

FIGURE 11a is a view similar to FIGURE 10a showing the forces involved in the closing of the molds.

FIGURE 15 is a diagrammatic view illustrating the manner in which the molds may be varied from the vertical.

FIGURE 16 is a partial view showing one half of a mold with the parison therein insufficient to provide material for the handle.

FIGURE 17 is a similar view illustrating how when the plastic is supplied to a mold angularly displaced sufficient material is provided for molding the handle or irregular abutments.

FIGURE 18 is a sectional view taken on section line 18—18 of FIGURE 15.

FIGURE 28 is an elevational view with parts in section of the means for operating the pincers with the pincers shown in open position.

FIGURE 29 is a similar view illustrating the pincers in closed position.

FIGURE 30 is a bottom plan view of the cutter together with operating means therefor.

Figure 25:
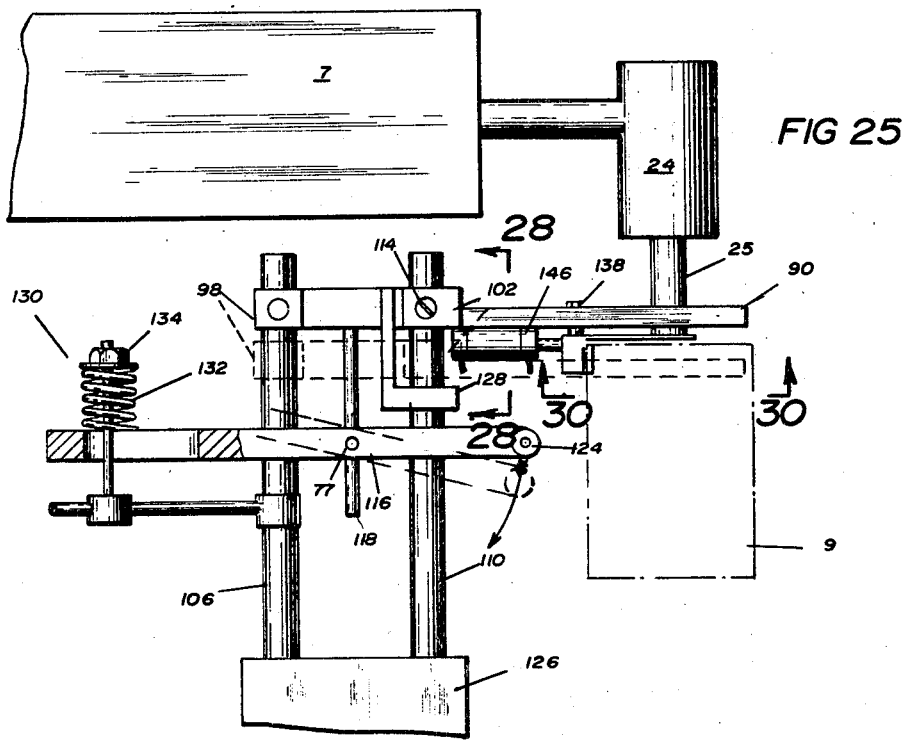
FIGURE 25 is a partial side view of the extrusion nozzle showing particularly the pinching and cutting mechanism for the parison.
Figure 26:
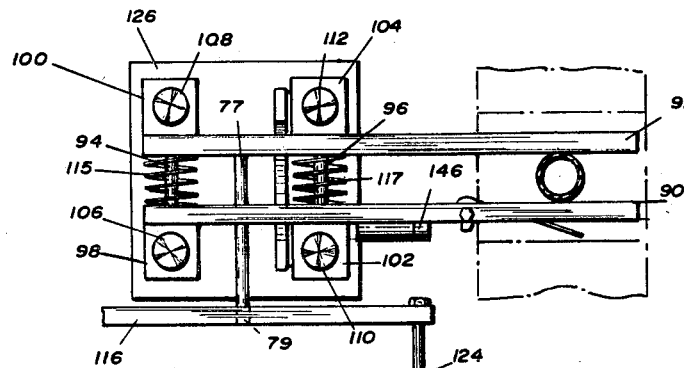
FIGURE 26 is a plan view of the pincers and cutting knife when in open position.
Figure 27:
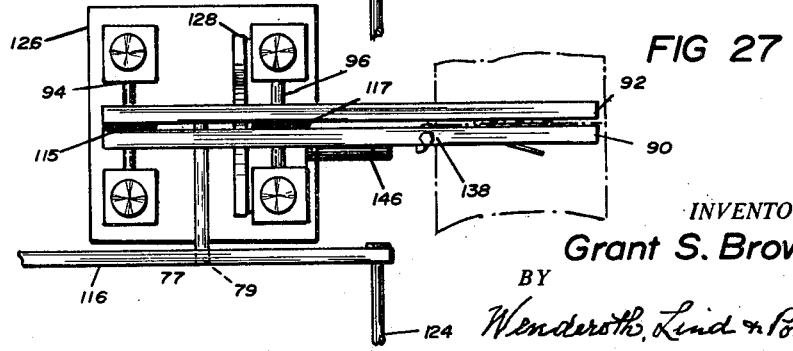
FIGURE 27 is a similar view illustrating the pincers in closed position with the cutter about to operate.

As shown in FIGURE 1, a motor 1 drives the shaft 2 having a gear 3 fixed thereon which in turn drives the gear 4 fixed to the main shaft 5. The shaft 5 is mounted for rotation in the frame 6. Thermoplastic material is extruded through a conventional extruder 7 which is fed by a screw 8 which is driven in any desired adjustable manner. The outlet 24 shown particularly in FIGURE 25 is located so as to feed the thermoplastic material downwardly. When the tube of material 25 is of the requisite length, the mold 9 closes.

Mounting of the molds

Figure 12:
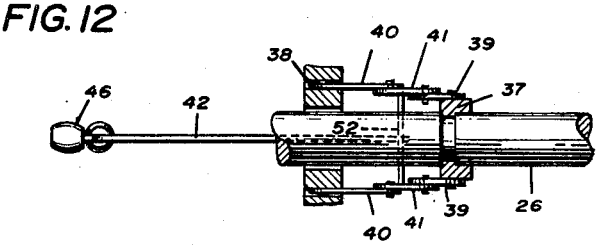
FIGURE 12 is a partial plan view illustrating the toggle mechanism.
Figure 14:
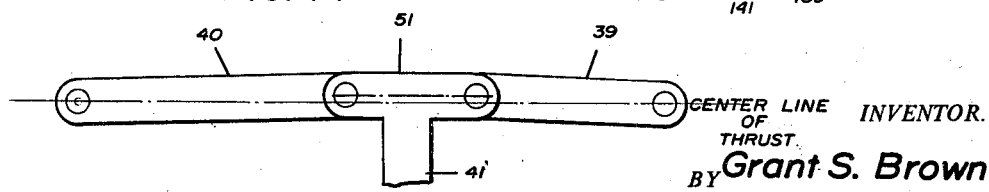
FIGURE 14 is an enlarged partial elevational view illustrating the positive locking feature of the toggle mechanism.

A plurality of the molds 9 are mounted for rotation with the shaft 5 on the spaced flanges 10 and 11 as shown at the left in FIGURES 3 and 12 and 14 as shown at the right. These flanges are provided on the sleeves 15 and 16 respectively. The sleeve 16 is fixed to the shaft 5 while the sleeve 15 is fixed to a sleeve 17. The sleeve 17 in turn is fixed to a collar 18 which is provided with a flange 19 secured to the shaft 5.

Each of the molds 9 are formed by two halves 20 and 21 which in FIGURE 3 are shown in the open position at the top and in closed position at the bottom. Each of the halves 21 is mounted on an axially movable rod 22 sliding in a bearing 23 slidingly mounted upon the flange 12. Each of the halves 20 is correspondingly fixed to a rod 26 axially slidable in a bearing 27 slidingly mounted upon the flange 11.

Figure 8:
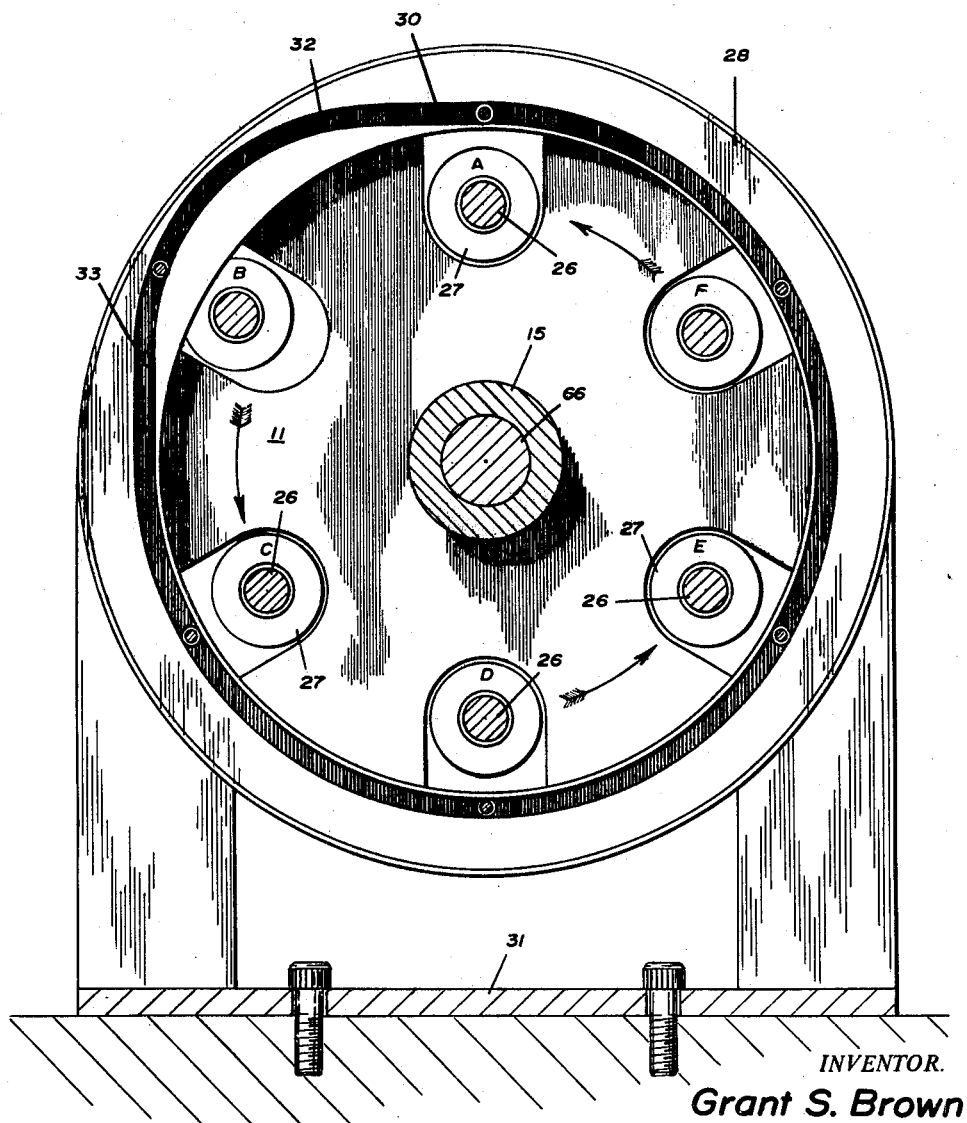
FIGURE 8 is a cross-sectional view taken along section line 8—8 of FIGURE 3 illustrating particularly the path of travel of the molds.

In the rotary movement of the molds with the shaft 5 the molds are caused to travel a path wherein a horizontal component of their movement and a vertical component is provided. This is caused by providing in fixed standards 28 and 29 a cam track 30 as shown in FIGURE 8. The standards 28 and 29 are fixed to the base 31 and the cam track 30 is provided with the horizontal component 32 and the vertical component 33. Each of the bearings 27 is provided with a cam follower 34 which travels in the cam 30 provided upon the standard 28 while the bearings 23 are provided with cam followers 35 travelling in the cam track 30 provided upon the standard 29.

Figure 9:
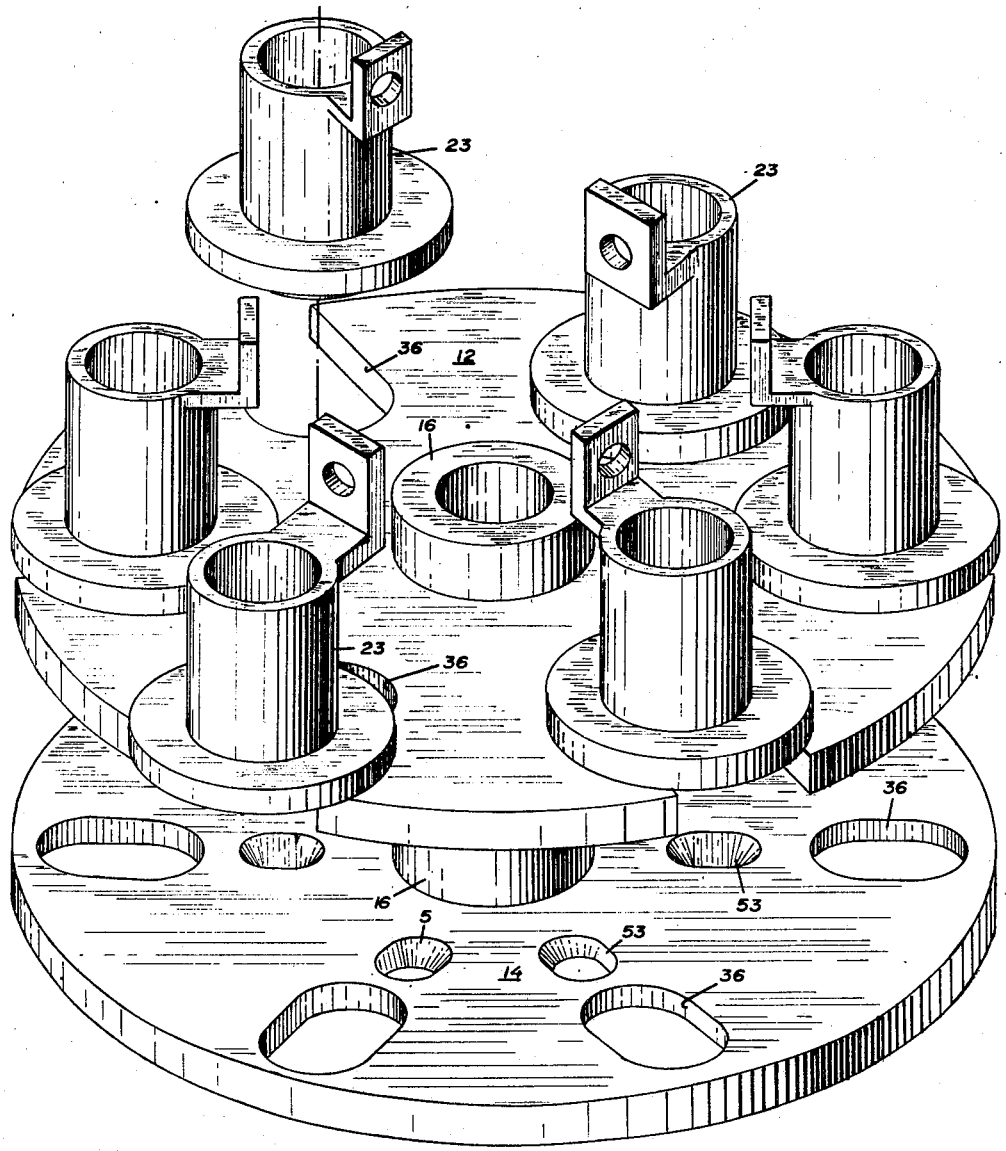
FIGURE 9 is a perspective view of a rotating frame at one side of the machine.

The spaced flanges 12 and 14 located at the right hand side of FIGURE 3 together with the sleeve 16 forms a rotating frame and a perspective view thereof is shown in FIGURE 9. The flanges 12 and 14 are provided with radially extending openings 36 to permit the axial movement of the bearings and also the mold halves for the horizontal and vertical components of the travel of the molds with the shaft 5. A similar construction is provided on the rotating frame formed by the flanges 10 and 11 and the sleeve 15.

The axial movement of the half molds 20 and 21 forming the open position to the closed position is accomplished by a toggle mechanism shown particularly in FIGURES 3, 10, 10a, 11 and 11a. Fixed to the rod 26 is a collar 37 and slidable upon the rod 26 is another collar 38. Pivotally secured to the collar 37 which moves with the rod 26 is a link 39 and pivotally secured to the collar 38 which remains fixed in position, is a link 40. The links 39 and 40 are pivotally secured to a T-shaped link 41 at the top portion thereof as shown in FIGURES 10 and 11. The above construction is duplicated at the opposite side of the rod 26 and the lower ends of the links 41 are connected by a rod 52 to which the control link 42 is connected as shown in FIGURE 12.

Figure 13:
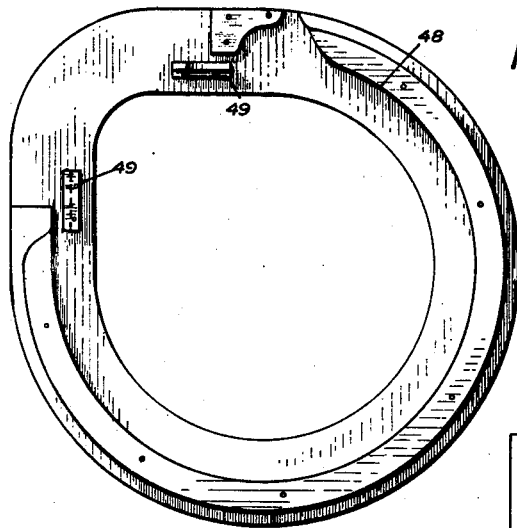
FIGURE 13 is a plan view of a cam for operating the toggle mechanism.

Attached to the flange 10 is a bracket 43 having a pin 44 and the pin 44 extends through a slot 45 provided in control link 42 to support such link. At the other end of the link 42 from its pivotal connection with the rod 52 two cam followers 46 and 47 are provided. The cam followers are positioned at right angles to one another as shown and the cam follower 46 cooperates with the cam track 48 provided upon the standard 6 and the cam follower 47 cooperates with the cam track 49 provided on a block 50 attached to the standard 6. The cam 49 cooperating with the cam follower 47 provides for the horizontal movement of the control link 42 so as to move the control link 42 to the left as shown in FIGURE 11 and then the cam track 48 cooperates with the cam follower 46 to pivot the control link 42 as illustrated in FIGURE 10. The diagrammatic movements shown in FIGURES 10a and 11a illustrate the extreme positions of the toggle construction. In FIGURE 10a the toggle linkage is illustrated in fully collapsed condition wherein the half molds 20 are withdrawn to the left as shown in the upper portion of FIGURE 3 with the molds in fully opened position. FIGURE 11a illustrate the position of the toggle links when the half mold 20 is fully moved to the right as shown at the bottom portion of FIGURE 3 and in FIGURE 11 when the molds are in closed position. The position of the links 39 and 40 and the cross piece 51 of the T-shaped link 41 is shown in FIGURE 14 wherein it will be noted that the line connecting the pivot points of the links 39 and 40 to the link 41 is slightly above the horizontal which results in a positive locking of the molds when in closed position. In order to unlock the toggle mechanism it is therefore necessary to provide at first the horizontal movement of the link 42 by means of the cam 49. Thereafter the force necessary for completely unlocking the toggle system may be easily supplied by the cam follower 46 cooperating with the cam track 48. In FIGURE 13 the contour of the cam 48 is illustrated and in FIGURE 12 a partial plan view is shown illustrating the connection of the collar 37 with the rod 26 and also the connection of the toggle mechanism with the collar 38. It will be noted that the links 39, 40 as well as the T-shaped link 41 are provided on opposite sides of the rod 26. The lower ends of the links 41 are connected by a rod 52 to which the control link 42 is connected.

The control links 42 extend through the openings 53 provided in the flanges 10 and 14 as illustrated in FIGURE 9.

Means controlling position of molds

The bearings 23 are mounted upon the sleeve bearings 54 rotatably mounted on the rods 22 while the bearings 27 are mounted upon the sleeve bearings 55 upon the rods 26. Fixed to the sleeve bearings 54 and 55 are the mold cradles 56 of which one is shown in perspective in FIGURE 2. Each mold half 20 and 21 is provided at the outer side thereof with a back 57 having at the lower end thereof a tongue 58 sliding in a groove 59 located at the bottom of the cradle 56. This construction maintains the mold halves in perfect alignment at all times.

Fixed to the sleeve 55 is a bevel gear 60 and any movement thereof will be transmitted via the sleeve 55 to the cradle 56 and thereby to the mold halves 20 and 21. In order to accomplish a movement of such mold halves so as to maintain the molds in vertical position while accomplishing the rotary movement about the shaft 5 the bevel gear 60 meshes with a bevel gear 61 provided at the upper portion of a shaft 62 as more particularly shown in FIGURES 4, 5, 6 and 7.

The shaft 62 is mounted in collars 63 provided upon the bearings 27 and extend radially inwardly towards the shaft 5 as shown more particularly in FIGURE 4.

The inner ends of the shaft 62 carry bevel gears 64 fixed to the shaft 62 and the bevel gears 64 mesh with a bevel gear 65 fixed upon a shaft 66. The shaft 66 is fixed and has a bearing at its inner end at 67 in the ends of the shaft 5 and in the bearing 68 at its outer end to which a flange 69 is secured as shown in FIGURES 15 and 18. Secured also to the shaft 66 is a knurled knob 70. The flange 69 is secured to the frame 6 by the bolts 71 which extend through elongated slots 72 provided upon the flange 69. An index 73 is mounted upon the frame 6 and upon the flange 69 indicia is engraved showing the degrees from 0 to 5° at each side of the vertical. Whenever it is desired to change the orientation of the molds 9 from the full line position shown in FIGURE 15 to the dotted line position or in the opposite direction it is merely necessary to loosen the bolts 71 and then move the flange 69 fixed to the shaft 66 to the desired degree line as shown upon indicia 73 and 74. This causes a slight movement of the gear 65 relative to the shaft 5 which thereby brings about a slight angular movement of the cradle 56 which tilts the molds 9 in the desired degree. By means of this it is possible to divert the position of the parison or thermoplastic material 25 from the position in which it is normally fed into the mold as shown in FIGURE 16 to the position shown in FIGURE 17 where it is at a slight angle to the walls of the mold thereby making it possible to provide an additional quantity of thermoplastic material to take care of irregular protuberances such as the handles 75 upon plastic bottles 76. Normally, in order to maintain the exact vertical position of the molds the gear 65 being fixed to the shaft 66 will bring about a rotation of the shafts 62 as the shaft 5 rotates thereby maintaining the molds 9 and the cradles 56 in the correct vertical position during the entire travel about the shaft 5.

Pinching and cutting mechanism

The pinching and cutting mechanism is located below the extruder 7 and is more particularly shown in FIGURES 25 to 30 inclusive.

In FIGURE 25 the means for synchronously gripping and severing the parison 25 after it has been enclosed between the mold halves is shown. The pincers 90 and 92 are slidably mounted on spacer rods 94 and 96 which are fixedly mounted on blocks 98, 100, 102 and 104 forming two block-pairs 98, 100, and 102, 104, which will move respectively together. Blocks 98, 100, 102 and 104 are mounted on standards 106, 108, 110 and 112, respectively. The block-pair 98, 100 is slidable along standards 106, 108, but the block-pair 102, 104 is fixedly mounted on standards 110, 112 by the set screw 114.

A downward movement of the standards 110, 112 will carry the block-pair 102, 104 downwardly by a like amount. As stated, the block-pair 102, 104 is connected through the pincer arms 90, 92 to the block-pair 98, 100, and therefore any downward motion on the part of the block-pair 102, 104 will cause a downward motion on the part of the block-pair 98, 100 sliding on the standards 106 and 108. Such a downward travel of the pincers assembly is shown in dotted lines in FIGURE 25.

Depending from pincer arm 90 is link 118 and from arm 92 is link 120. It is these links through which the rod 77 passes. The pincers are further connected by the rod 77 which is fixedly mounted at one end to link 120 while link 118 is free to slide on rod 77. Such sliding is normally inhibited by springs 115 and 117, which serve to space the pincher arms apart, and which are mounted on the rods 94 and 96. The pincher arms are normally held against the blocks.

At the end of the rod 77 opposite the connection with the link 120, there is pivotally connected at 79 an arm 116. At one end of arm 116 is a rod 124 which has at its other end (not shown) a cam follower. This cam follower tracks the rotating cam surface 78 shown in FIG. 31 which has six lobes. These lobes are designed in such a way that they will depress the cam follower once each time a mold assembly rotates into position below the injection head 24. The depression of the cam follower will cause a corresponding downward movement of rod 124, which will then pivot arm 116 about rod 77.

The pivoting action of 116 will move standards 110 and 112 downwardly into the fixed stand 126, because of the connections 96. This will result in a downward motion of the entire assembly, including the sliding of the rear blocks 98 and 100 on the standards 106 and 108.

As shown best in FIGURES 28 and 29, the downward motion of the pincher arms is opposed and limited by the fixed cam 128. FIGURE 28 shows the arms in open position before depression while FIGURE 29 shows the closed position of the pincers after depression of the arms. Because of the incurving of the cam 128, the pincher arms are forced inwardly toward one another, overcoming the pressures of the springs 115 and 117. At the bottom of the paths of motion, the pincher arms will have swung together to have pinched the parison at a point directly above the just closed mold.

It should be noted that the parison is being continuously extruded having a certain definite rate of flow. It is possible, using the arrangement described, to either match this speed with the downward speed of the pincers, or to introduce a velocity differential and consequently controllable stretch in the stream of plastic. The factors involved in this operation are: (1) the shape of cam 128; (2) the shape of moving cams 78; (3) the speed of the extrusion; (4) the speed of the machine; (5) the control mechanism 130 of FIGURE 25. Of these five factors, only the last would normally be adjusted or adjustable during a production run, the others being fixed by the conditions of production, the constituents of the plastic mixture, and so on.

The control mechanism 130 consists of a spring 132 which is mounted on the end of lever 116 in order to oppose the rotation of arm 116 about rod 77. The amount of pressure exerted by spring 132 on arm 116 is controllable by the adjusting nut 134.

Mounted at the underside of one of the pincher arms, for example, pincher arm 90, is a pivoting assembly 136 consisting of pivot 138 and bell crank 140, which carries cutter knife 142. The bell crank 140 also is pivotally fixed to piston rod 144 of air piston 146. Air piston 146 is controlled by a valve 148, see FIGURE 29. Air valve 148 is mounted on cam 128 and is actuated by the downward action of pincher arm 90. Thus, as the pincher arms reach full engagement with the parison in stream, the air piston 146 is actuated, and the bell crank 140 pivoted about 138. This causes the cutter knife 142 to sever the parison at a point between the pinching point of the stream and the top of the just closed mold.

The thermoplastic material 25 is extruded through the extruder 24 in a downward direction in the form of a tube. When the tubing reaches a predetermined length it is pinched by the grippers 90 and 92 and the mold 9 closes. The gripping action is caused by the downward movement of the lever 124 and the rod 77 causing the grippers 90 and 92 to cooperate with the cam 128. The grippers are only closed when moving in the downward direction. The rate of downward movement of the grippers 90 and 92 is controlled by the movement of the control mechanism 130 towards or away from the pivot 79. The control mechanism 130 is adjusted to give the proper downward rate of movement of the grippers 90 and 92 in relation to the movement of the mold 9.

The tubing in the mold is cut from the parent body by the pivotal action of the cut-off knife 142. At this point the mold 9 continues to move downwardly while the grippers 90 and 92 open and the lever 116 rises for a repeat operation.

Figure 34:
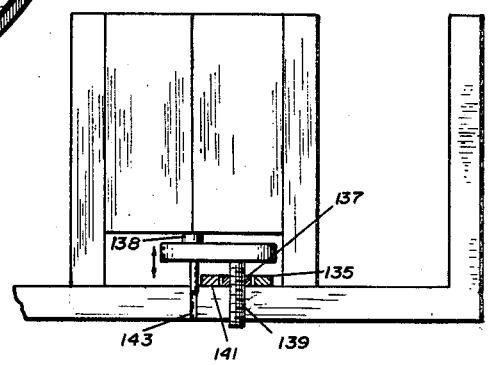
FIGURE 34 is a view similar to FIGURE 20 showing the blow head mechanism located so as to blow air into the bottom of a mold when the neck portion of the container to be formed is located at the bottom of the mold.

When the containers are formed in the molds 9 with the neck portion downwardly (see FIG. 34) then the blowing operation is accomplished as shown in FIGURE 34. In this case, the cut off knife 142 instead of being mounted at the underside of the pincher 90 is mounted on the top side thereof. When a predetermined length of tubing 25 has been extruded in this case the pincers 90 and 92 grip the tubing and it is cut from the parent body by the action of the knife 142 thereby leaving the tubing with an open end. As the molds move, the tubing is lowered over the forming and blow pin 138 and the mold 9 closes. The movement of the rack 135 actuated by a cam (not shown) cooperates with a rotatable pinion 137 threaded upon the rod 139 fixed to the blow head to move the blow head 138 upwardly thereby pressing the finish and admitting air to the parison for the formation of the container. When the blow head 133 is to be removed the rack 141 is actuated by a cam (not shown) and the movement of the pinion 137 is reversed bringing a downward movement of the blow head 133. A guide rod 143 is fixed to the blow head to maintain it accurately in position to guide the vertical movement. With this construction it is not necessary to bring about the angular movement of the blow head as by the oscillatable member 88 above described. When the neck of the container therefore is positioned downwardly in the mold the operative construction is somewhat simplified.

Blow head construction

In FIGURES 19 to 24 inclusive, the blow head construction for subjecting the parison in the mold to air pressure is shown. In FIGURE 3 the conduits 80 supply the coolant material to the molds through a collar 81 rotatable upon the shaft 5 and from such collar the coolant material is supplied through the shaft 5 by means of the usual circular grooves and collars such as 82 to the rods 22 and 26 to all the half molds 20 and 21 to cool the same. In FIGURE 3 such cooling means is shown somewhat diagrammatically but various cooling systems are in common use and well known for the molds.

Figure 32:
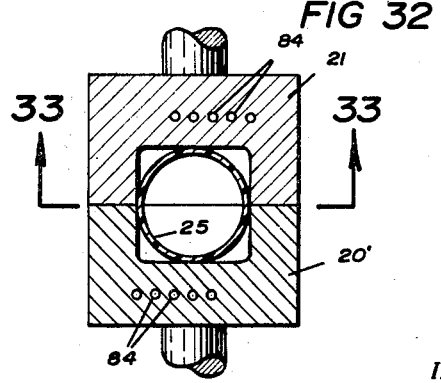
FIGURE 32 is a sectional view taken upon section line 32—32 of FIGURE 31.

In FIGURE 32 ducts 84 are shown in the mold halves 20 and 21 whereby the molds are continuously cooled during operation.

However, with regard to the air pressure to be supplied to the parison this should not be supplied continuously but only intermittently when the molds 9 are closed. Compressed air is supplied through the conduit 83 to the collar 81 and from there through the shaft 5 to the collar 82.

Figure 19:
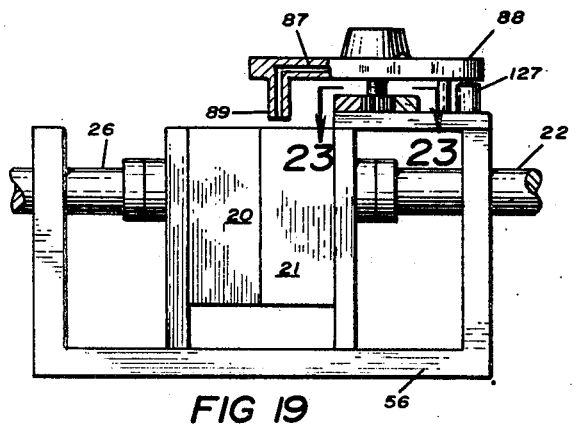
FIGURE 19 is a view showing the blow head mechanism in open position.
Figure 23:
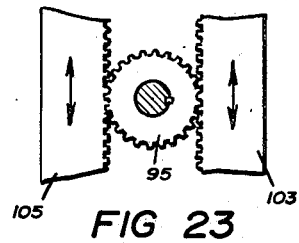
FIGURE 23 is a sectional view taken along section line 23—23 of FIGURE 19.
Figure 22:
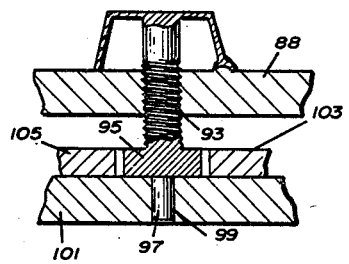
FIGURE 22 is a sectional view taken along section line 22—22 of FIGURE 21.
Figure 21:
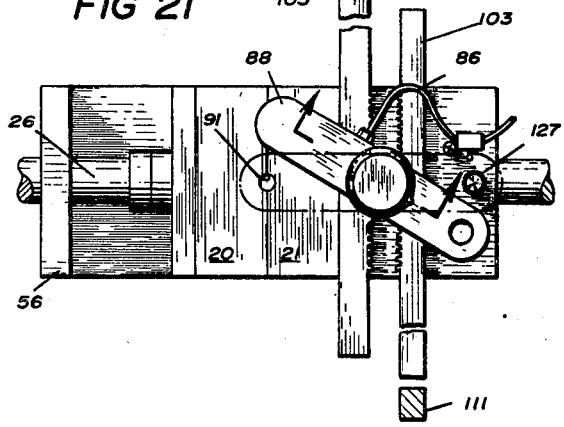
FIGURE 21 is a top plan view of FIGURE 19.
Figure 24:
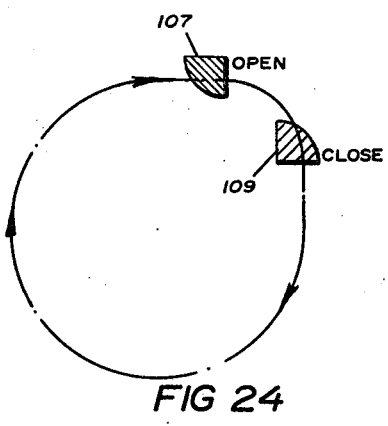
FIGURE 24 is a schematic showing illustrating the path of a mold as well as the relative positions of the opening and closing cam.
Figure 20:
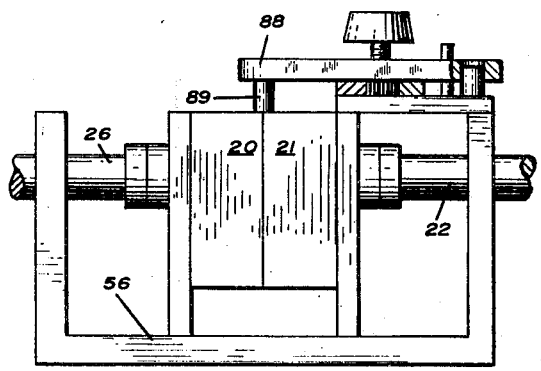
FIGURE 20 is a similar view illustrating the blow head mechanism in closed position.

From the rod 22 an outlet 85 is provided to which a flexible connection 86 is connected which leads to the conduit 87 provided in the oscillatable member 88 located at the top of the cradle 56 and shown in FIGURES 19, 20 and 21. The outlet 89 of the conduit 87 must be moved downwardly as shown in FIGURE 20 to be applied to the blow hole provided at the meeting sides of the half molds 20 and 21 and must then also be oscillated to the full line position shown in FIGURE 21 from the dotted line position. In order to accomplish this movement the member 88 is mounted on a screw 93 having a spur gear 95 keyed thereto as shown in FIGURE 23 and such spur gear has a pin 97 fitting in a slot 99 provided in a supporting surface 101 fixed to the cradle 56. The spur gear 95 is actuated by two racks 103, 105 which cooperate with the cams or abutments 107 and 109 mounted upon a fixed portion of the frame at the proper positions so that when the abutment 107 is contacted by an abutment 111 upon the rack 103 the member 88 will be moved to the full line position as shown in FIGURE 21 and when the abutment 113 upon rack 105 contacts the abutment or cam 109 the member 88 will be moved to the dotted line position as shown in FIGURE 1 and due to the screw thread mounting thereof upon the screw 93 will be lowered so as to bring the outlet 89 into closed position with the blow hole in the mold. It will be noted that from the closed position beginning with the position of abutment 109 air will be supplied to the parison during the entire rotary motion until rack 103 is moved upon the contact with abutment 107. Also the movement of the member 88 to open position will actuate a valve which controls the conduit 87 to shut off the air pressure in such conduit and when the rack 105 is actuated by the cam 109 such valve is again actuated to open conduit 87 to the air pressure so that air under pressure will be supplied to the parison.

Removal of articles

Figure 31:
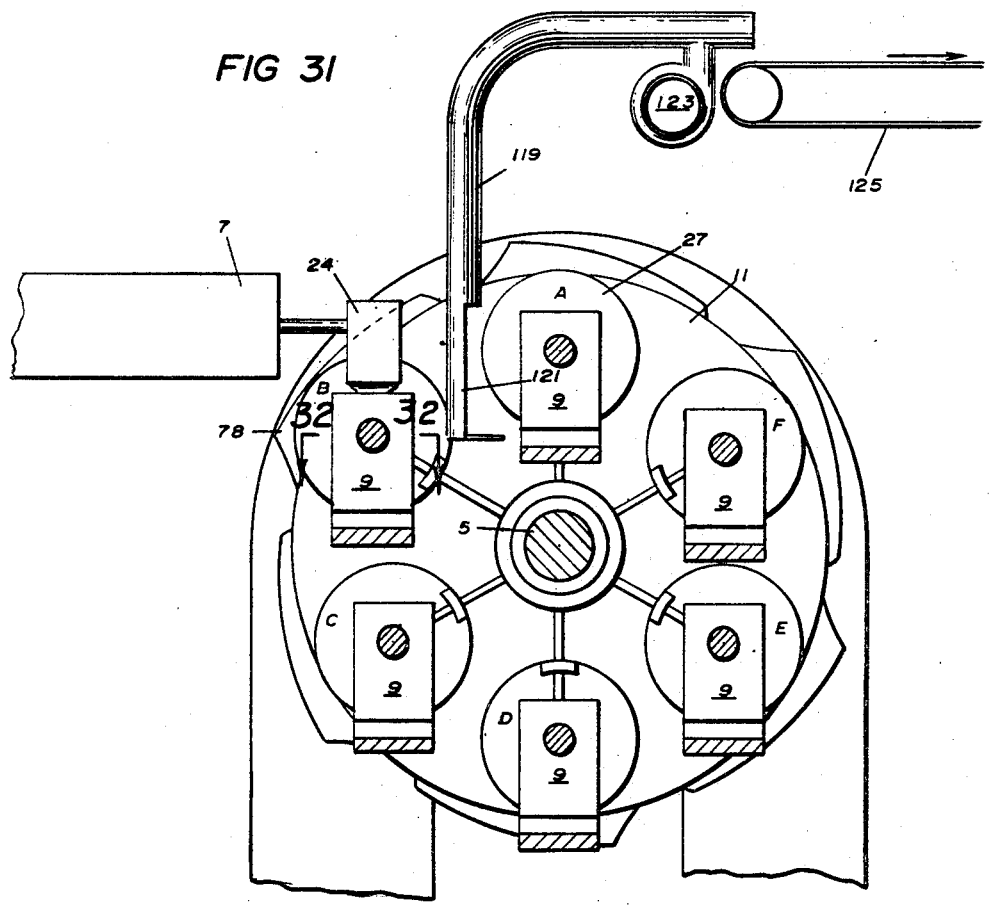
FIGURE 31 is a diagrammatic central vertical view illustrating particularly the removal means for finished articles and the cams for actuating the opening and closing of the pincers.
Figure 33:
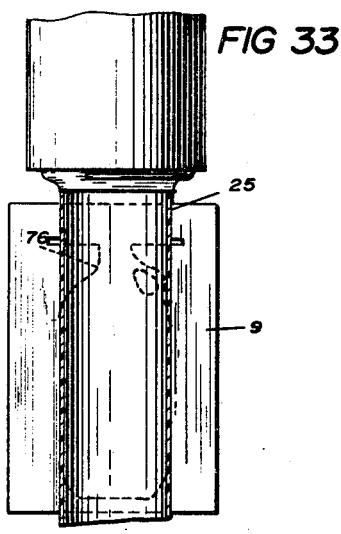
FIGURE 33 is a sectional view taken upon section line 33—33 of FIGURE 32.

In FIGURE 31 a vacuum tube 119 is shown having an inlet 121 located at the point where the molds 9 are opened and an exhaust is supplied by the fan 123 so that the finished articles may be drawn through the tube 119 and deposited upon the belt 125 and removed from the machine.

The article formed when blown into finished form cools for about 270° of the circular movement, more or less depending upon the set up and article, starting at the horizontal center line. When the article reaches its top position the article is carried outwardly on a straight horizontal path which is ordinarily approximately 10 inches in length as shown at 32 in FIGURE 8. During this horizontal movement the molds 9 open, the rack 103 is actuated which raises the blow head arm 88 until the member 88 disengages from the dowel pin 127 and then continued movement of the rack 103 moves the blow head mechanism angularly away from the center line of the neck finish of the article just as the blown article in a mold 9 engages the take away chute 119 where the container is removed from the machine.

Intermittent operation

As the molds rotate with the shaft 5 they will pass through the stations A, B, C, D, E and F as shown particularly in FIGURES 4 and 8. As they pass through these stations each mold will be opened at the station A and then the completed article will be removed. At the station B the thermoplastic material will be fed thereto and at the station C each mold will be closed and the compressed air supplied thereto so as to form the shape of the article at such point. From the station C through the stations D, E and F to the stations A the molds will be cooled.

In the travel of each mold it is essential to maintain the molds with their longitudinal axes substantially vertical by the mechanism particularly disclosed in FIGURE 4. This will prevent any weaknesses occurring in the plastic material such as uneven wall thicknesses in the blown container.

The angular speed of the molds from one station to the next is equal throughout the entire circular movement even though the speed of travel from the station A to the station B and from the station B to the station C may be increased by the horizontal component 32 and the vertical component 33. In view of the same angular speed of the molds between the different stations an intermittent feed of the molds from one station to another is accomplished by inserting a clutch 129 on the shaft 2 as shown in FIGURE 3 and a timing device 131 for operating such clutch to connected and disconnected position. By such timing device it is also possible to hold the molds at the various stations a predetermined time to permit the various operations to take place as well as cooling and also if desired the molds may be moved through two stations or more upon each intermittent movement.

I claim:
1. An apparatus for making hollow plastic articles from a softened tubular plastic material comprising a plurlity of sectional molds, each mold comprising a pair of mold halves defining a mold cavity to receive the tubular plastic material when the mold is open, a support carrying said molds for successive alignment thereof with the tubular plastic material, said support being rotatable in a vertical circular plane, means for maintaining said molds when rotating with their vertical axes directed in the tubular plastic material to one end when the mold halves in predetermined sequence, means for cutting said tubular material, means on each of said molds for sealing the tubular plastic material to one end when the mold is in closed position and means operably associated with each of said molds at the opposite end of the mold cavity for introducing an expanding fluid into the tubular plastic material when the mold is closed.

2. An apparatus as set forth in claim 1 wherein said means for maintaining said molds when rotating with their vertical axes directed in one direction comprises a first bevel gear, a second bevel gear rotating with said molds and means interconnecting said first and second bevel gears.

3. An apparatus as set forth in claim 1 wherein means are provided for changing the direction of the vertical axes of said molds.

4. An apparatus as set forth in claim 2 wherein means are provided for rotating said first bevel gear with reference to said second bevel gear to change the vertical axes of all of said molds from the vertical.

5. An apparatus as set forth in claim 1 wherein all of said molds have a common parallel surface and means are provided for adjusting the angularity of said parallel surfaces simultaneously.

6. An apparatus as set forth in claim 1 wherein means are provided for providing a predetermined stretch of said tubular plastic material at the time of cutting said tubular material.

7. An apparatus as set forth in claim 1 wherein means are provided for varying the circular movement of said support to provide a variable predetermined inches per second mold movement at the time of closing said mold halves.

8. An apparatus for making hollow plastic articles from a softened tubular plastic material comprising a plurality of sectional molds, each comprising a pair of mold halves defining a mold cavity having a substantially vertical axis and adapted to receive the tubular plastic material when the mold is open, a support carrying said molds for successive alignment thereof with the tubular plastic material, said support being rotatable in a vertical circular plane having a horizontal and vertical component in said circular motion thereby to effect straight-line movement in substantial alignment with the tubular plastic material, means for opening and closing said mold halves in predetermined sequence, means for cutting said tubular plastic material, means on each of said molds for sealing the tubular plastic material at one end when the mold is in closed position and means operably associated with each of said molds at the opposite end of the mold cavity for introducing an expanding fluid into the tubular plastic material when the mold is closed.

9. An apparatus as set forth in claim 8 wherein means are provided for changing the direction of the vertical axes of said molds.

10. An apparatus as set forth in claim 8 wherein all of said molds have a common parallel surface and means are provided for adjusting the angularity of said parallel surfaces simultaneously.

11. An apparatus as set forth in claim 8 wherein means are provided for varying the circular path of said mold to provide a variable predetermined inches per second mold movement at the time of closing said mold halves.

12. An apparatus as set forth in claim 8 wherein means are provided for supplying said tubular plastic material to said mold halves when said mold halves are moving vertically and means are provided for removing said finished articles when said mold halves are moving horizontally.

13. An apparatus as set forth in claim 8 wherein said means for cutting said tubular plastic material may be accomplished at a predetermined distance from the mold when closed upon said plastic material.

14. An apparatus for making hollow plastic articles from a softened tubular plastic material comprising a frame, a rotating shaft mounted in said frame, a pair of spaced supports fixed to said shaft, each of said supports carrying a plurlity of longitudinally slidable rods, each of said rods having rotatably mounted thereon a mold half to cooperate with a mold half similarly mounted upon a rod upon the other support aligned therewith to form a mold for said plastic articles, a radially movable bearing slidably mounted upon each support for supporting said rods, a cradle rotatably mounted upon said bearings, each of said cradles connecting aligned rods in said two supports, said mold halves being slidably mounted in each of said cradles, toggle means for advancing and retracting each mold half towards and away from its associated mold half in its associated cradle to open and close said mold, means cooperating with said frame for operating each of said toggle means at predetermined times for opening and closing each mold, means for maintaining said cradles and said mold halves in vertical position during the rotation of said shaft and means for feeding tubular plastic material to said mold halves when retracted to open position.

15. An apparatus as set forth in claim 14 wherein each of said supports comprises a sleeve fixed to said shaft having a pair of spaced radially extending flanges.

16. An apparatus as set forth in claim 14 wherein said bearings are provided with cam followers and a fixed standard is secured to said frame having a cam track with which said followers cooperate in order to secure the radial movement of said bearings during the rotation of said shaft.

17. An apparatus as set forth in claim 14 wherein said means for maintaining said cradles and said mold halves in vertical position during the rotation of said shaft comprises a fixed shaft aligned with said first named shaft, a bevel gear on said fixed shaft, a sleeve bearing on each of said rods, a bevel gear on said sleeve bearing and means interconnecting said bevel gears to maintain said mold halves in vertical position.

18. An apparatus as set forth in claim 14 wherein a fixed shaft having a bevel gear thereon controls the movements of said cradles during the rotation of said shaft to maintain said mold halves in vertical position.

19. An apparatus as set forth in claim 18 wherein means are provided cooperating with said fixed shaft to adjust the angularity of said cradles and said mold halves with respect to the vertical during the rotation of said shaft.

20. An apparatus as set forth in claim 14 wherein cooling means are supplied through said shaft and said rods to said mold halves.

21. An apparatus as set forth in claim 14 wherein compressed air is supplied to said mold at predetermined times during the rotation of said shaft.

22. An apparatus as set forth in claim 14 wherein said toggle means comprise a pair of collars on each of said rods, links connecting said collars and a control link cooperating with cam tracks upon said frame to separate said collars and thereby close said mold and at the same time place a connecting line between the attachment of said links to said collars slightly above horizontal to thereby lock said toggle means when the mold is in closed position.

23. An apparatus as set forth in claim 22 wherein said control link is provided with two distinct motions, one to break the locking of said toggle means and the other to retract said mold halves to open position.

24. An apparatus for making hollow plastic articles from a softened tubular plastic material comprising a frame, a rotating shaft mounted in said frame, a support fixed to said shaft, a plurality of molds mounted upon said support, said molds being equally angularly spaced about said shaft defining a plurality of stations, means for moving said molds to and from predetermined stations at a speed differing from the angular speed of said shaft thereby to permit straight-line movement of each said mold at at least one such station, means for opening and closing said mold in predetermined sequence, means for cutting said tubular material, means for sealing the tubular plastic material at one end when the mold is in closed position and means operably associated with each of said molds at the opposite end of the mold cavity for introducing an expanding fluid into the tubular plastic material when the mold is closed.

25. An apparatus as set forth in claim 24 wherein means are provided for intermittently rotating said shaft to said stations.

26. An apparatus for making hollow plastic articles from a softened tubular material comprising a rotating shaft, a plurality of molds mounted around said shaft for movement thereby, means for moving said molds independently toward and away from said rotating shaft thereby to effect straight-line mold movement during a portion of the rotary movement imparted to said molds by said shaft and means for independently changing the relative angularity of said molds.

27. An apparatus for making hollow plastic articles from a softened tubular plastic material comprising a plurality of sectional molds, each mold comprising a pair of mold halves defining a mold cavity to receive the tubular plastic material when the mold is open, a support carrying said molds for successive alignment thereof with the tubular plastic material, said support being rotatable in a vertical circular plane, means for maintaining each said mold in a fixed orientation relative to the tubular plastic material during that portion of mold travel wherein the tubular material enters the mold, means for opening and closing said mold halves in predetermined sequence, means for cutting said tubular material, means on each of said molds for sealing the tubular plastic material at one end when the mold is in closed position and means operably associated with each of said molds at the opposite end of the mold cavity for introducing an expanding fluid into the tubular plastic material when the mold is closed.

28. An apparatus for making hollow plastic articles from a softened tubular plastic material comprising a plurality of sectional molds, each mold comprising a pair of mold halves defining a mold cavity to receive the tubular plastic material when the mold is open, a support carrying said molds for successive alignment thereof with the tubular plastic material, said support being rotatable in a vertical circular plane, means for maintaining each of said molds in a fixed orientation relative to the tubular plastic material during that portion of mold travel wherein the tubular material enters the mold, means for opening and closing said mold halves in predetermined sequence, means for cutting said tubular material, means on each of said molds for sealing the tubular plastic material at one end when the mold is in closed position and means operably associated with each of said molds for causing expansion of the tubular plastic material when the mold is closed.

References Cited

UNITED STATES PATENTS

| 2,579,399 | 12/1951 | Ruekberg. |
| 2,790,994 | 5/1957 | Cardot et al. |
| 2,925,863 | 2/1960 | Chaplin _____ 162—391 |
| 2,954,581 | 10/1960 | Colombo. |
| 3,005,231 | 10/1961 | Pechthold. |
| 3,344,471 | 10/1967 | Martelli. |

WILBUR L. McBAY, Primary Examiner

U.S. Cl. X.R.

18—20; 65—361; 162—391